(12) United States Patent
Akiyama

(10) Patent No.: US 6,629,032 B2
(45) Date of Patent: Sep. 30, 2003

(54) VEHICULAR COMMUNICATION SYSTEM FOR COMMUNICATING INFORMATION AMONG ELECTRONIC DEVICES INSTALLED IN VEHICLE

(75) Inventor: Susumu Akiyama, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/189,628

(22) Filed: Jul. 8, 2002

(65) Prior Publication Data

US 2003/0018422 A1 Jan. 23, 2003

(30) Foreign Application Priority Data

Jul. 18, 2001 (JP) .......................... 2001-217857
May 24, 2002 (JP) .......................... 2002-150718

(51) Int. Cl.[7] .............................. G05B 1/00; G05B 3/00
(52) U.S. Cl. ............................... 701/48; 701/36; 701/1
(58) Field of Search ........................... 701/48, 29, 36, 701/49, 1; 340/901; 710/100, 105, 305; 709/107; 714/730

(56) References Cited

U.S. PATENT DOCUMENTS 6,240,340 B1 * 5/2001 Minowa et al. ................ 701/1
6,421,593 B1 * 7/2002 Kempen et al. ............... 701/48
6,434,459 B2 * 8/2002 Wong et al. ................... 701/36

FOREIGN PATENT DOCUMENTS

| JP | A-5-235870 | 9/1993 |
| JP | A-6-112915 | 4/1994 |
| JP | A-2000-006738 | 1/2000 |
| JP | A-2001-168895 | 6/2001 |

* cited by examiner

Primary Examiner—Richard M. Camby
(74) Attorney, Agent, or Firm—Posz & Bethards, PLC

(57) ABSTRACT

A vehicular communication system communicates information among a plurality of ECUs installed in a vehicle. The communication system includes a plurality of transceiver circuits for communicating information, and each transceiver circuit is provided in an associated one of the ECUs. The transceiver circuits are divided into groups of transceiver circuits. Each transceiver circuit of a given group communicates with the transceiver circuits of the same group using one of a predetermined communication frequency and a predetermined code, which is allocated to the given group and is different from that of any other group.

11 Claims, 7 Drawing Sheets

| SOURCE ID | DATA ID | DATA | CRC |

VEHICULAR COMMUNICATION SYSTEM FOR COMMUNICATING INFORMATION AMONG ELECTRONIC DEVICES INSTALLED IN VEHICLE

CROSS REFERENCE TO RELATED APPLICATION

This application is based on and incorporates herein by reference Japanese Patent Application No. 2001-217857 filed on Jul. 18, 2001 and Japanese Patent Application No. 2002-150718 filed on May 24, 2002.

BACKGROUND OF THE INVENTION

1. Field of the Invention

This invention relates to a vehicular communication system for communicating information among various electronic devices installed in a vehicle.

2. Description of Related Art

In vehicles, and particularly cars, the number of electronic devices such as control units, information devices, and audio devices mounted in the vehicle has been increasing, and linked operation and information sharing among these electronic devices is becoming necessary.

Because of this, in related art, those electronic devices mounted in a vehicle among which linked operation and information sharing is necessary have been connected by dedicated communication lines to form information communication networks (so-called vehicle LANs), so that information can be transmitted and received among the devices.

However, in recent years, as the number and variety of electronic devices has increased and the capabilities of these electronic devices have improved, the number of networks to be built into vehicles has also increased, and as a result of this it is becoming difficult to install the communication lines for these different networks in the vehicles.

That is, currently, because vehicles are tending to become smaller as fuel prices increase, the space available in vehicles for installing communication lines is becoming smaller. Furthermore, since, as mentioned above, the number of communication lines required to be installed in vehicles is increasing, designing layouts for these communication lines at the time of vehicle design is becoming difficult, and the work of installing the lines during the actual manufacture of the vehicle is also becoming difficult.

As a result, there has been the disadvantage that the labor expended in vehicle design and vehicle manufacture for constructing these various networks in vehicles has become considerable, and is leading to considerably increased vehicle cost.

SUMMARY OF THE INVENTION

The present invention addresses the above disadvantage. Thus, it is an objective of the present invention to provide a vehicular communication system, which allows transmission and reception of information among various electronic devices installed in a vehicle without requiring a relatively large number of communication lines that connect the electronic devices.

To achieve the objective of the present invention, there is provided a vehicular communication system that communicates information among a plurality of electronic devices installed in a vehicle. The vehicular communication system includes a plurality of communicating means for communicating information, and each communicating means is provided in an associated one of the electronic devices. The plurality of communicating means is divided into groups of communicating means. Each communicating means of a given group communicates with the communicating means of the same group using one of a predetermined communication frequency and a predetermined code, which is allocated to the given group and is different from that of any other group.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Various embodiments of the present invention will now be described with reference to the accompanying drawings.

Figure 1:
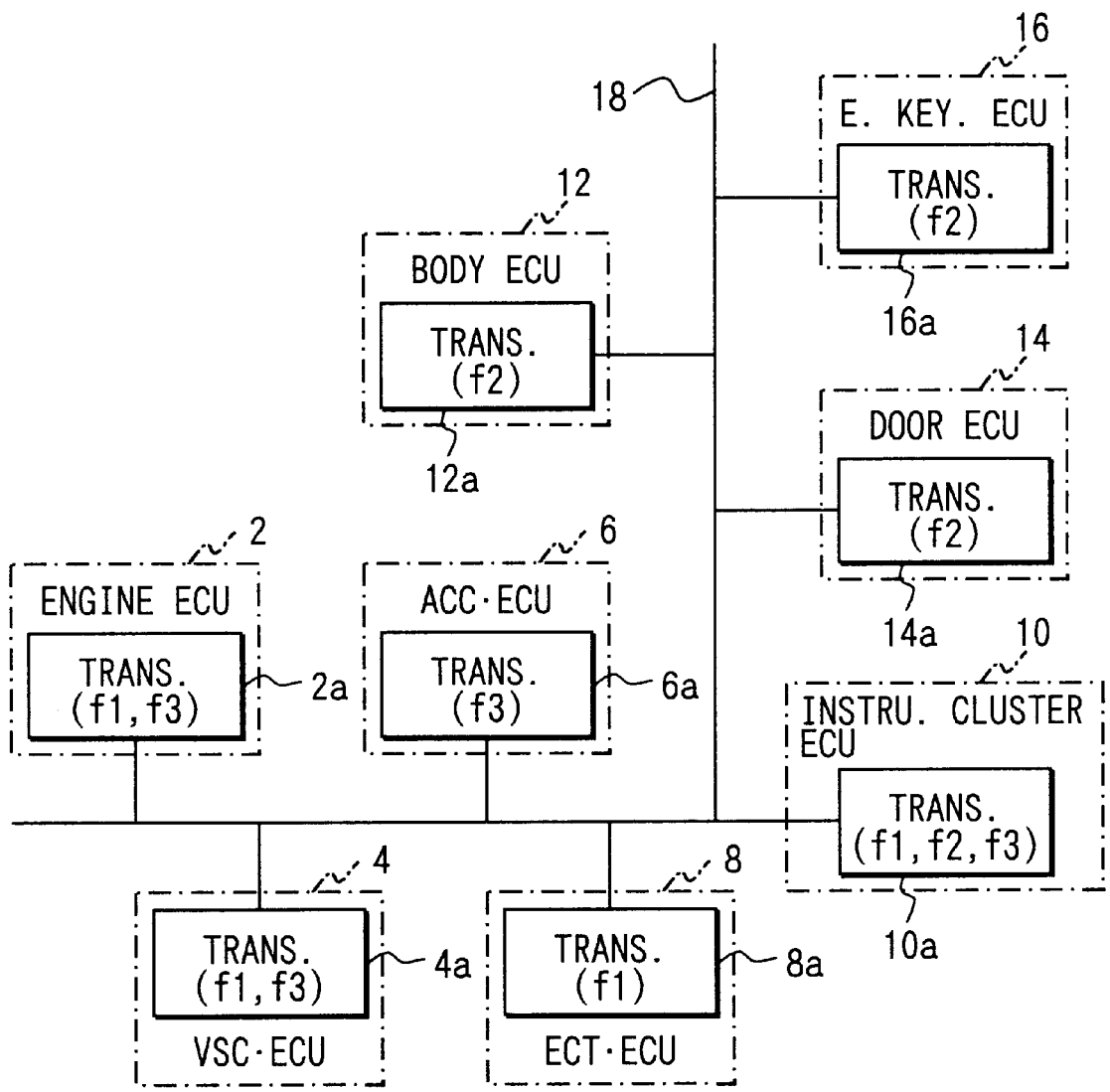
FIG. 1 is a schematic view showing the overall construction of a vehicular communication system according to a first embodiment of the present invention.

With reference to FIG. 1, a vehicular communication system according to a first embodiment of the present invention includes transceivers 2a, 4a, 6a, 8a, 10a, 12a, 14a, 16a, which are built into an engine ECU 2, a VSC ECU 4, an ACC ECU 6, an ECT ECU 8, an instrument cluster ECU 10, a body ECU 12, a door ECU 14 and an electronic key ECU 16 (these ECUs act as electronic devices), respectively, and a power supply line 18 connecting these transceivers.

The engine ECU 2 is an engine control unit for controlling an engine. The ECT ECU 8 is a gear shift control unit for performing gear shift control of an automatic transmission. These ECUs 2, 8 are control units of a so-called power train system. The VSC ECU 4 is a control unit for performing vehicle attitude control and braking control. The ACC ECU 6 is a control unit for performing control that makes the vehicle follow a vehicle in front. These ECUs 4, 6 are control units of a so-called vehicle motion system.

The instrument cluster ECU 10 is for displaying information on a display device about the state of the vehicle, such as the vehicle speed, the engine speed, states of doors (i.e., whether the doors are open or closed), and the shift range of the transmission. The electronic key ECU 16 is a control unit for receiving and demodulating transmitted radio wave signals and determining whether these radio wave signals are from an electronic key. When it is determined that the radio wave signals are from the electronic key, the electronic key ECU 16 transmits information to the body ECU 12 indicating an instruction from the electronic key. The body ECU 12 is a control unit for, in accordance with instructions obtained from the electronic key ECU 16, ordering the door ECU 14 to lock or unlock the doors, or starting an operation of an anti-theft ECU (not shown) when the doors are locked and occupants have moved away from the vehicle. The door ECU 14 is a control unit for locking and unlocking the doors in accordance with instructions from the body ECU 12 and, when doors are open, transmitting that information to the body ECU 12. These are control units of a so-called body system.

The transceiver 2a–16a of each ECU 2–16 converts information outputted from a micro controller of the ECU 2–16 into transmission signals and sends these out onto the power supply line 18, which serves as a communication line. Furthermore, the transceiver 2a–16a of each ECU 2–16 receives and demodulates transmission signals transmitted over the power supply line 18 from other ECUs and outputs these to the micro controller.

In this embodiment, the information transmitted and received among these transceivers 2a–16a is grouped based on types of the information (or types of the ECUs) into the information of the power train system information (e.g., engine speed, shift position), the information of the vehicle motion system (e.g., vehicle speed, vehicle acceleration) and the information of the body system. The information of the power train system is obtained, for example, by the engine ECU 2 and the ECT ECU 8. The information of the vehicle motion system is obtained, for example, by the VSC ECU 4 and the ACC ECU 6. The information of the body system is obtained, for example, by the instrument cluster ECU 10, the body ECU 12, the door ECU 14 and the electronic key ECU 16. A transmission frequency for transmitting the information over the power supply line 18 is set for each of these groups. Thus, for example, the information of the power train system is transmitted at a frequency f1, the information of the body system is transmitted at a frequency f2, and the information of the vehicle motion system is transmitted at a frequency f3. That is, in this embodiment, the different types of information undergo multiplex transmission (FDMA) at transmission frequencies set based on the types of the information (in other words, types of functional systems).

To realize this multiplex transmission, the transceiver 2a–16a of each ECU 2–16 can not only obtain information of the functional system (the power train system, the body system, the motion system) to which the ECU 2–16 belongs, but also information of other functional systems, if that information is required.

That is, for example, the engine ECU 2 needs not only the information of the power train system but also the information of the vehicle motion system (e.g., the vehicle speed). Thus, the transceiver 2a of the engine ECU 2 includes two types of transceiver circuits corresponding to the transmission frequencies f1 and f3, so that the transceiver 2a can transmit and receive information at both these frequencies f1 and f3. Furthermore, for example, the instrument cluster ECU 10 needs the information of the body system (e.g., open/closed states of the doors), the information of the power train system (e.g., engine speed) and the information of the vehicle motion system (e.g., vehicle speed). Thus, the transceiver 10a includes three types of transceiver circuits corresponding to the transmission frequencies f1, f2 and f3, so that the transceiver 10a can transmit and receive information at all of these frequencies.

Figures 2A, 2B:
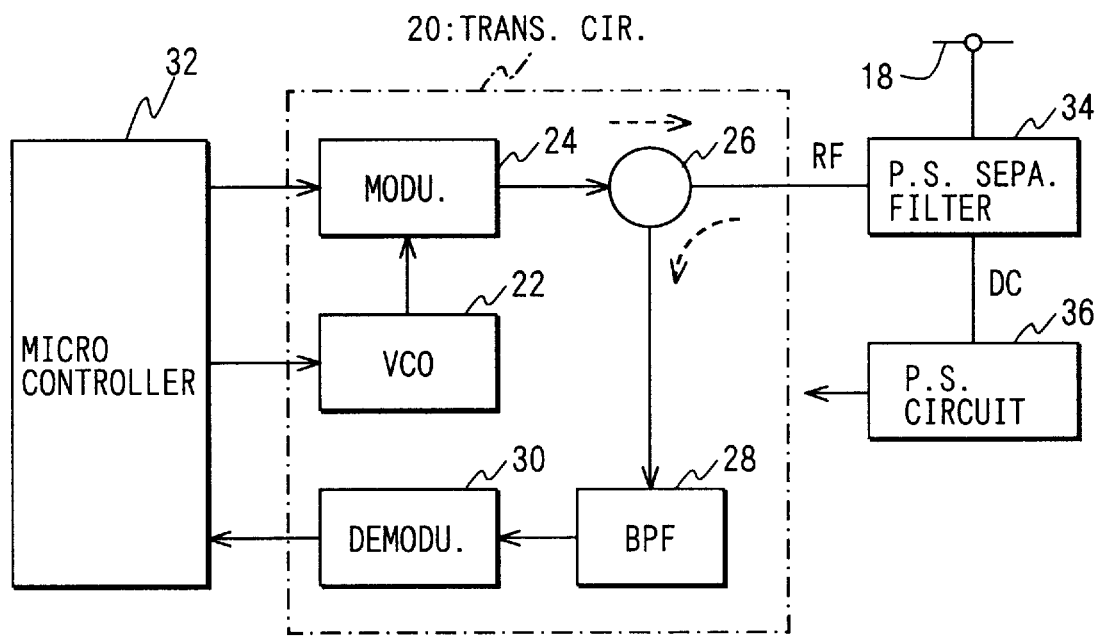
FIG. 2A is a block diagram showing the construction of a transceiver circuit and peripheral circuitry thereof used to realize FDMA multiplex communication in the first embodiment.
FIG. 2B is a schematic view showing a data structure of information communicated through the transceiver circuit.

The one or more transceiver circuits of each of the transceivers 2a–16a are each constructed for example as shown in FIG. 2A. This transceiver circuit acts a communicating means of the invention.

With reference to FIG. 2A, the transceiver circuit 20 of this embodiment performs FDMA multiplex communication and includes a voltage-controlled variable oscillator (VCO) 22, a modulator 24 and a directional coupler 26. The voltage-controlled variable oscillator (VCO) 22 generates carrier waves at a predetermined frequency (one of f1–f3), which is set based on the type of the information to be communicated. The modulator 24 generates a transmission signal by modulating (for example FM-modulating) the carrier wave signal generated by the variable oscillator 22 using transmission information outputted from the micro controller 32. The directional coupler 26 outputs the transmission signal received from the modulator 24 to a power supply separation filter 34 connected to the power supply line 18.

As shown in FIG. 2B, the transmission information outputted from the micro controller 32 includes original data as well as a source ID, a data ID and an error check or correction code (here, CRC), which are added to the original data. The source ID is preset to identify the ECU of the source (i.e., its own ECU). The data ID indicates the type of the data being transmitted along with the data ID. The error check or correction code (here, CRC) is used for error check or correction.

A timing, at which the micro controller 32 outputs the transmission information to the transceiver circuit 20, is determined in accordance with a schedule. This schedule is set for each group of information (i.e., for each functional system), which is communicated through the corresponding transceiver circuit 20, in a manner that avoids interference or collision of the transmission signals. The micro controller 32 retrieves this schedule information from a memory and outputs the transmission information at the timing, at which the transmission of the transmission information is allowed. As a result, there is no collision of transmission signals transmitted by the transceiver circuit 20 with transmission signals transmitted by another transceiver circuit of the same group.

Thus, in this embodiment, in order to make sure that the micro controller 32 of each ECU executes the transmission and reception of the information correctly in accordance with the above-mentioned schedule set for each group, the micro controller 32 of each ECU periodically transmits/receives time information (e.g., a time stamp) indicating the present time through the transceiver circuit 20. The micro controller 32 of each ECU executes a time adjusting process for adjusting an internal timer (clock) based on the time information. As a result, in the vehicular communication system of this embodiment, the time kept by each of the ECUs is the same, and thus the information transmission time and information reception time are matched among the ECUs.

In a path leading from the power supply line 18 to the transceiver circuit 20, the power supply separation filter 34 blocks direct current or low-frequency components and passes high-frequency components, which constitute the transmission signals. Furthermore, in a path from the power supply line 18 to a power supply circuit 36 of each ECU 2–16, the power supply separation filter 34 blocks high-frequency components and passes direct current or low-frequency components. Consequently, transmission signals of a predetermined frequency band (one of f1–f3) generated by the modulator 24 are outputted over the power supply line 18 through the power supply separation filter 34.

Transmission signals from other transceiver circuits inputted to the transceiver circuit 20 from the power supply line 18 through the power supply separation filter 34, on the other hand, are inputted to a band pass filter (BPF) 28 through the directional coupler 26. The BPF 28 selectively passes only transmission signals in the same frequency band as the transmission signals generated by the modulator 24 (that is, transmission signals from other transceiver circuits belonging to the same group as this transceiver circuit 20), and blocks signals in other frequency bands. Transmission signals, which have passed through the BPF 28, are demodulated (for example, FM-demodulated) into corresponding information by a demodulator 30 and inputted to the micro controller 32.

The micro controller 32 then identifies the source ID and the data ID from the received information. Next, the micro controller 32 determines whether the received information is required for its own control operations. When it is determined that the received information is required for its own control operations, the micro controller 32 stores the received information in the memory.

As explained above, in the vehicular communication system of this embodiment, each vehicle ECU 2–16 includes the transceiver 2a–16a, which is capable of transmitting and receiving various types of information over the power supply line 18. Furthermore, the transceiver 2a–16a of each ECU 2–16 includes the one or more transceiver circuits 20 to perform the multiplex transmission and reception of information between that ECU and other ECUs over each corresponding transmission frequency, which differs from group to group.

Consequently, unlike the previously proposed networks (vehicle LANs), the vehicular communication system of this embodiment does not require dedicated communication lines in the vehicle to achieve the linked operation of the ECUs 2–16 and sharing of information among the ECUs 2–16. As a result, the system can be realized in a simple manner at a low cost.

In the vehicular communication system of this embodiment, one transceiver circuit 20 of one group, which uses the same transmission signal frequency (i.e., which uses the same communication channel), transmits information to all of transceiver circuits 20 of the other ECUs in the same group. Then, when this information is received by the transceiver circuit 20 of any other ECU in the same group, the other ECU determines whether the received information is necessary. When it is determined that the received information is necessary, the received information is stored in the memory of the ECU. As a result, the information can be effectively transmitted and received in each group.

In the embodiment described above, the transceiver circuits 20 of the same group carry out FDMA multiplex communication. However, the simultaneous multiplex communication can also be realized using CDMA, so that the transceiver circuits 20 may alternatively be constructed to transmit and receive information using a spread spectrum system or method. Furthermore, in the above embodiment, the information is transmitted and received between the ECUs over the power supply line 18, which supplies the power from a vehicle battery to each ECU, to eliminate the dedicated wiring between the ECUs. However, in this invention, since the multiplex communication is used, the information can be transmitted between the ECUs over a dedicated communication signal line or can be transmitted between the ECUs over a wireless communication link. With reference to FIG. 2A, in the case where the dedicated signal line is used in place of the power supply line 18, it is only required to remove the power supply separation filter 34 and to newly connect the dedicated signal line to the transceiver circuit 20 to replace the power supply line 18 with it. However, in such a case, it should be noted that the dedicated signal line is required in addition to the power supply line 18 of FIG. 1.

A vehicular communication system, which uses a CDMA multiplex wireless communication, will be described as a second embodiment of the present invention.

Figure 3:
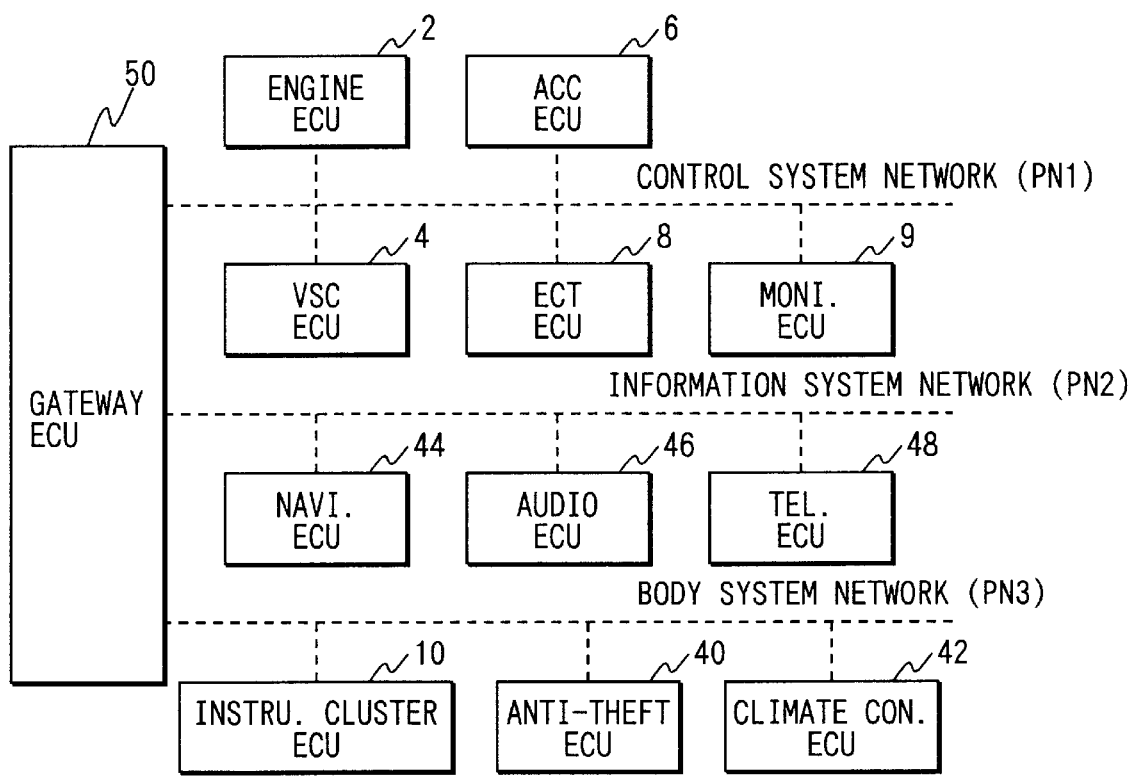
FIG. 3 is a schematic view showing the overall construction of a vehicular communication system according to a second embodiment of the present invention.

As shown in FIG. 3, in the vehicular communication system of the second embodiment, various wireless networks, such as a control system wireless network, a body system wireless network and an information system wireless network, are provided. The control system wireless network includes the engine ECU 2, the VSC ECU 4, the ACC ECU 6, the ECT ECU 8 and the surrounding area monitoring ECU 9. The body system wireless network includes the instrument cluster ECU 10, the anti-theft ECU 40 and the climate control ECU 42. The information system wireless network includes a navigation ECU 44, an audio ECU 46 and a telephone ECU 48.

In this embodiment, to construct the network of each functional system, each ECU includes a transceiver circuit 60 (see FIG. 4) for performing spread spectrum (SS) communication using a PN code (pseudo-random noise code), which is allocated to each network.

That is, each ECU in the control system network includes a transceiver circuit 60 for performing the SS communication using a code PN1. Each ECU in the information system network includes a transceiver circuit 60 for performing the SS communication using a code PN2. Each ECU in the body system network includes a transceiver circuit 60 for performing the SS communication using a code PN3.

To exchange necessary information between the networks, the vehicular communication system of this embodiment additionally includes a dedicated gateway ECU 50, which acts as an information relaying means. To transmit and receive the information between the gateway ECU 50 and any of the ECUs in each system network, the gateway ECU 50 includes three types of transceiver circuits 60 for performing the SS communication using all of the codes PN1, PN2 and PN3.

Figure 4:
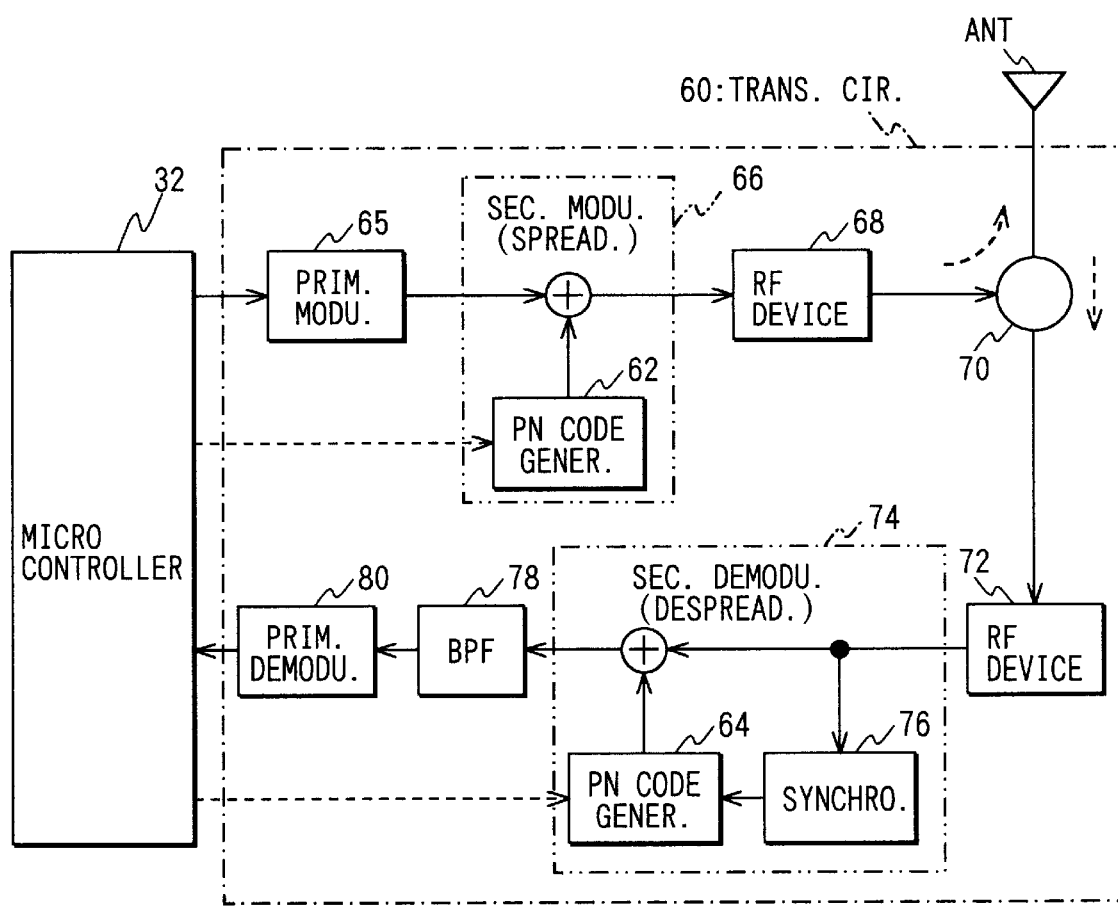
FIG. 4 is a block diagram showing the construction of a transceiver circuit and peripheral circuitry thereof used to realize CDMA multiplex communication in the second embodiment.

The transceiver circuits 60 used in this embodiment are constructed, for example, as shown in FIG. 4.

That is, each transceiver circuit 60 in this embodiment achieves the simultaneous multiplex wireless communication by transmitting and receiving the information through the SS communication. Thus, each transceiver circuit 60 includes two (one for transmitting, one for receiving) PN code generators 62, 64 for generating PN codes allocated to the networks, respectively, as mentioned above.

In this transceiver circuit 60, the transmission information (of the same construction as that shown in FIG. 2B) from the micro controller 32 is first primarily modulated by a primary modulator 65 (PSK, FSK or the like). Then, a PN code generated by the PN code generator 62 is combined with the primarily modulated signal in a secondary modulator 66 to spread the transmission signal and is then amplified by an RF device 68. The transmission signal outputted from the RF device 68 is fed to an antenna ANT through a directional coupler 70 and is then transmitted from the antenna ANT.

The transmission information is outputted from the micro controller 32 in a manner similar to that discussed with reference to the first embodiment. That is, the information is outputted from the micro controller 32 at a predetermined timing specified in the schedule information previously stored in the memory. Thus, in the vehicular communication system of the second embodiment, the transmission signal outputted from the transceiver circuit 60 does not interfere or collide with the transmission signal outputted from any other transceiver circuit 60 in the same group (the same network). Similar to the first embodiment, in order to assure the correct transmission and reception of the information between the ECUs based on the schedule information, each micro controller 32 periodically transmits and receives the time information (e.g., time stamp) indicating the current time through the transceiver circuit 60 and adjusts its internal timer (clock) based on the time information.

The transmission signal from the other transceiver circuit is received by the antenna ANT and is then inputted to an RF device 72 through the directional coupler 70. The received signal is amplified by the RF device 72 and is then combined with the PN code, which is generated by the PN code generator 64, in a secondary demodulator 74 to despread the received signal. The second demodulator 74 includes a synchronizer 76 for synchronizing the PN code generated by the PN code generator 64 with the received signal. The received signal, which is despread by the secondary demodulator 74, is inputted to a primary demodulator 80 through a BPF 78. Then, the received signal is demodulated to the original information and is then inputted to the micro controller 32 as the received information.

Here, the transceiver circuit 60 shown in FIG. 4 is designed for a known direct sequence spread spectrum communication system. Besides the direct sequence spread spectrum communication system, a frequency hopping spread spectrum communication system is also known and can be used in this embodiment. Furthermore, there are various arrangements even for the same spread spectrum communication system. Thus, when the transceiver circuit 60 is constructed, the most appropriate transceiver circuit 60 should be chosen for the intended communication system.

Similar to the first embodiment, the micro controller 32 determines whether the received information received from the transceiver circuit 60 is necessary for its own control operations. When it is determined that the received information is necessary, the micro controller 32 stores the received information in the memory.

Figure 5:
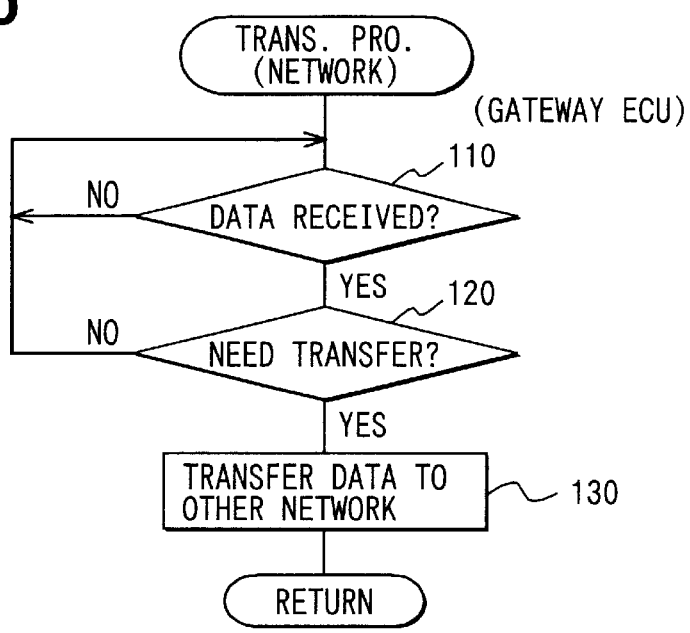
FIG. 5 is a flow chart showing a transferring process executable by a gateway ECU of the second embodiment.

The function of the gateway ECU 50 as the information relaying means is realized by the micro controller 32 of the gateway ECU 50 when the micro controller 32 executes a transferring process shown in FIG. 5 for each network (in other words, for each transceiver circuit 60 provided in the gateway ECU 50 for each network).

That is, as shown in FIG. 5, the gateway ECU 50 waits for the transceiver circuit 60 to receive the data (information) (step 110). The reception of the data by the transceiver circuit 60 is determined by determining whether the data has been inputted from the transceiver circuit 60. When the transceiver circuit 60 receives the data, the gateway ECU 50 determines whether the received data should be transferred to another network by checking the source ID and the data ID appended to the received data based on transfer information stored in the memory (i.e., by checking whether the received data is preset to be transferred to the transceiver circuits of another group) (step 120).

Then, when it is determined that the received data is not the data that should be transferred to the other network, control returns to step 110 where the gateway ECU 50 waits for the transceiver circuit 60 to receive data. On the other hand, when it is determined that the received data is the data that should be transferred to the other network, the gateway ECU 50 transfers the received data to the designated network by outputting the received data as the transmission information to the transceiver circuit 60 of the designated network (step 130).

After this process ends, the gateway ECU 50 returns to step 110 and repeats the transferring process. The transfer of the received data at step 130 is carried out in accordance with the schedule of the designated network, which is the destination of the transfer, and is carried out at a timing at which transmission from the gateway ECU 50 is allowed.

As described above, in the vehicular communication system of the second embodiment, each network is constructed for each corresponding functional system of ECUs. The transceiver circuit 60 of each ECU of the network performs transmission and reception of information through the SS communication using the common PN code allocated to that network. Consequently, with this embodiment, the simultaneous multiplex wireless communication is realized, and advantages similar to those discussed in the first embodiment can be achieved.

In the second embodiment, ECUs of one network do not have the capability of transmitting data to the ECUs of the other network. However, the gateway ECU 50 allows sharing of the information among the networks.

It is possible to provide more than one gateway ECU 50 in one communication system. The functions of the gateway ECU 50 as the information relaying means can be added to one or more of the ECUs of each network of the second embodiment. Furthermore, the functions of the gateway ECU 50 (as the information relaying means) can be added to one or more ECUs in the communication system of the first embodiment.

Although the two embodiments of the present invention have been described, the present invention is not limited to the two embodiments and can be embodied in any other forms.

For example, in the first embodiment, the transceiver circuits 20, which transmit and receive information, were grouped based on the types of the communicated information (the functional systems), and each ECU includes the transceiver circuit 20 of its group corresponding to the communicated information. In the second embodiment, the transceiver circuits 60 are grouped based on the types (functional systems) of the ECUs, and each ECU includes all types of the transceiver circuits 60 for transmitting and receiving required information (in other words, the transceiver circuits 60 of each ECU include the transceiver circuits, which belong to functional systems different from the functional system of that ECU). Alternatively, the transceiver circuits may be grouped by ECU basis, so that each ECU has a transmitter circuit (transmitter means) of its own group and at least one receiver circuit (receiver means), which receives the necessary information from a corresponding transmitter circuit of another ECU in the same group. In this way, although the number of communication channels is increased, causing an increase in the manufacturing cost of the entire system, it is not required to switch the transceiver circuit, which transmits information, in one communication channel (i.e., in one group), and information can be transmitted from each ECU through the dedicated communication channel at any time. Thus, when this modification is applied to a system that requires transmission of a relatively large amount of information at a relatively high speed, the modification can be used advantageously.

In the embodiments described above, the transmission schedule is preset for each group in such a manner that two or more transceiver circuits in the same group do not start transmission at the same time. In this case, it is possible to monitor whether information is transmitted and received properly in each group in accordance with the schedule (or whether information is transmitted and received at the predetermined timing specified by the corresponding schedule within the group).

Because of this, the vehicular communication system according to either of the embodiments described above may be further provided with a communication channel switching function. With the communication channel switching function, it is monitored whether information is properly communicated in each group (or whether information is transmitted and received at the predetermined timing specified by the schedule within the group). When it is determined that the information is not properly communicated in one group, the communication channel used in the group is automatically shifted to an auxiliary communication channel (auxiliary channel) by changing a frequency or PN code used by the transceiver circuits of the group for communicating the information. That is, a disturbance, such as a noise, can be introduced into the transmission signal, which is transmitted between the corresponding transceiver circuits. In such a case, the information cannot be properly transmitted between the corresponding transceiver circuits due to the disturbance. However, when this happens, the communication channel is immediately shifted to the auxiliary communication channel to properly communicate the information, thereby improving a reliability of the communication system.

In this connection, the vehicular communication system, which has the communication channel switching function, will now be described.

Figure 6:
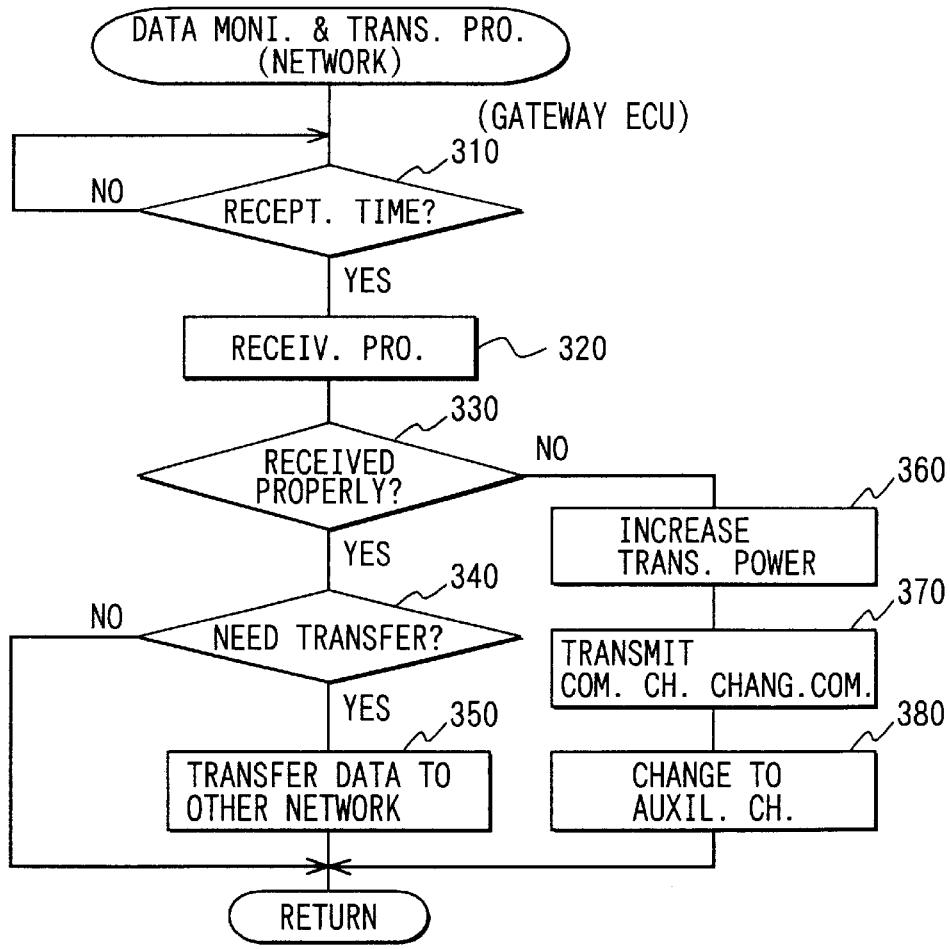
FIG. 6 is a flow chart showing an example of data monitoring and transferring process executable by the gateway ECU.

FIG. 6 is a flow chart showing a data monitoring and transferring process, which is executed for each group by the gateway ECU 50 in the communication system of the second embodiment. The gateway ECU 50 realizes the communication channel switching function in the following manner. That is, the gateway ECU 50 monitors whether information is properly communicated in each group. When a communication abnormality occurs, the gateway ECU 50 transmits a code changing command (in other words, a communication channel changing command) for changing the PN code to an auxiliary PN code to each corresponding transceiver circuit 60 of the group (in the second embodiment, this group is a network, such as the control system network) that is encountered with the communication abnormality.

The flow chart shown in FIG. 6 shows the process executed for each of the networks by the micro controller of the gateway ECU 50, like-the transferring process shown in FIG. 5.

As shown in FIG. 6, in this data monitoring and transferring process, the gateway ECU 50 first retrieves from its memory the schedule of the network, which includes the transceiver circuits 60 monitored by the gateway ECU 50. Then, the gateway ECU 50 waits for a time (a reception time), at which information is transmitted and received within that network (S310). Then, when this time is reached, the gateway ECU 50 executes a receiving process (step 320) for reading received information outputted from the transceiver circuit 60. At the next step 330, the gateway ECU 50 determines whether the data, which is transmitted based on the schedule, has been received properly (or whether the data has been transmitted and received at the predetermined timing specified by the schedule within the group).

When it is determined that data has been received properly at step 330, control moves to step 340. At step 340, it is determined whether the received data needs to be transferred to any other network based on the source ID and the data ID appended to the received data. When it is determined that the received data does not need to be transferred to any other network, control returns to step 310 where the transceiver circuit 60 of the gateway ECU 50 waits for reception of data.

On the other hand, when it is determined that the received data needs to be transferred to another network at step 340, control moves to step 350. At step 350, a process, which performs functions of the information relaying means, is executed, so that the received data is outputted as transmission information to the transceiver circuit 60 of the network, to which the received data is to be transferred, and thereby the received data is transferred through the transceiver circuit 60 to the other network.

When it is determined that data has not been received properly at step 330, it is then likely that the communication channel of the network being monitored is suffering from disturbance (noise). Thus, control moves to step 360. For example, at step 360, the current supplied to the RF device 68 is increased to increase the transmission power of the transceiver circuit 60. Then, at the next step 370, a process, which performs functions of a channel changing command generating means, is executed to transmit a communication channel (channel is abbreviated as "CH" in FIG. 6) changing command (channel changing command) from the transceiver circuit 60 to the ECUs of the corresponding network (i.e. the network in which the communication abnormality has been detected).

Then, at step 380, the PN code, which is set in the PN code generator 64 of the corresponding transceiver circuit 60 of the gateway ECU 50 itself, is changed to a PN code corresponding to a pre-set auxiliary channel (for example, PN1 is changed to PN1'), and control returns to step 310.

When the channel changing command is transmitted at step 370, the data structure of the channel changing command signal is made simpler than the normal data structure shown in FIG. 2B, for example, by reducing the number of bits to increase a length of the same bit data to improve the reliability in the communication of the information in order to make sure that the channel changing command is transmitted to all of the ECUs of the group (the network), in which the communication abnormality has occurred.

In each of the ECUs whose transceiver circuits 60 have received the channel changing command transmitted from the gateway ECU 50 through the process of step 370, the micro controller 32 executes the same process as that of step 380, so that the PN code, which is set in the PN code generator 64 of the transceiver circuit 60 having received the channel changing command, is changed to the PN code corresponding to the pre-set auxiliary channel (for example, PN1 is changed to PN1').

When the communication abnormality occurs in the communication channel of a certain group (network) due to the disturbance, such as the noise, the communication channel is automatically changed to the auxiliary channel by executing the data monitoring and transferring process shown in FIG. 6 in the gateway ECU 50. Thus, the transmission and reception of the information between the ECUs can be properly performed.

In the data monitoring and transferring process of FIG. 6, the channel changing command is transmitted from the gateway ECU 50 to the ECUs of the group, in which the communication abnormality has occurred, through the transceiver circuit, which has encountered the communication abnormality. Alternatively, for example, a transceiver circuit for emergency information use only (an emergency information communicating means or simply referred to as an emergency communicating means) can be provided in each of the ECUs, which constitute the vehicular communication system. When the gateway ECU 50 detects a communication abnormality in a certain group (network), the gateway ECU 50 can transmit the communication channel changing command to all of the ECUs through the dedicated emergency transceiver circuits.

Figure 7A:
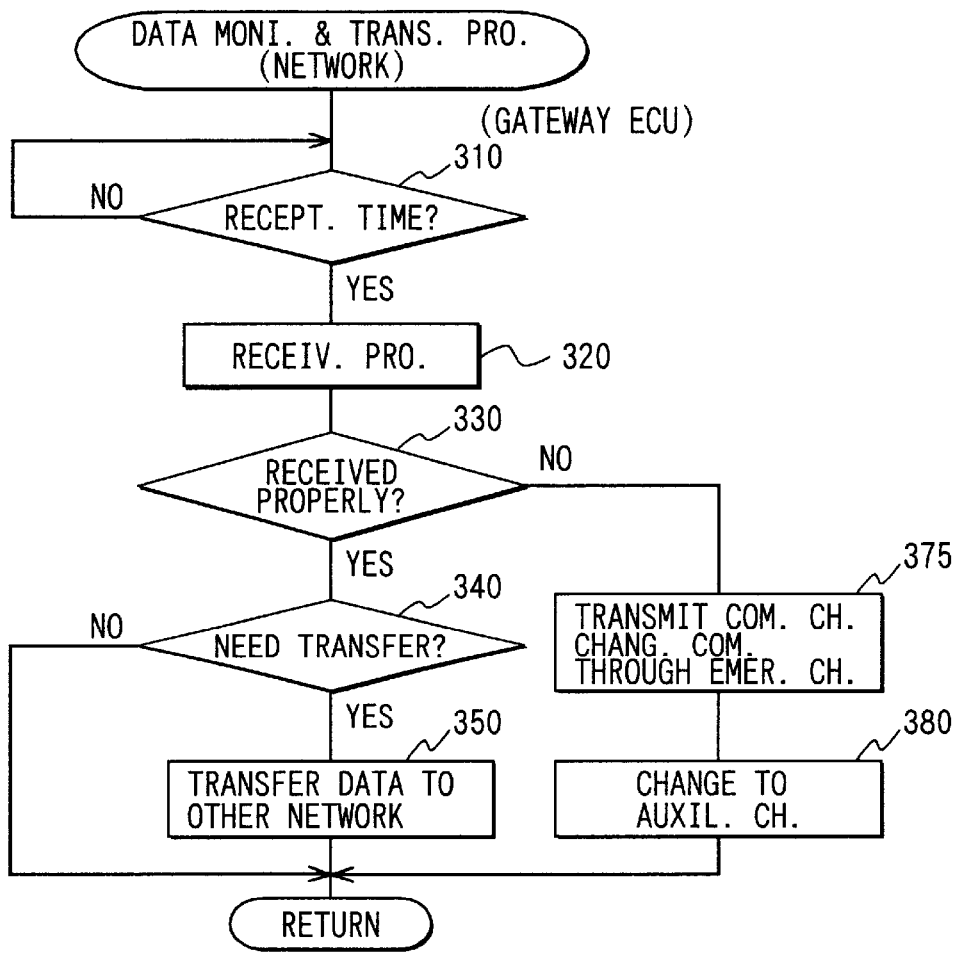
FIG. 7A is flow chart showing another example of data monitoring and transferring process executable by the gateway ECU.
Figure 7B:
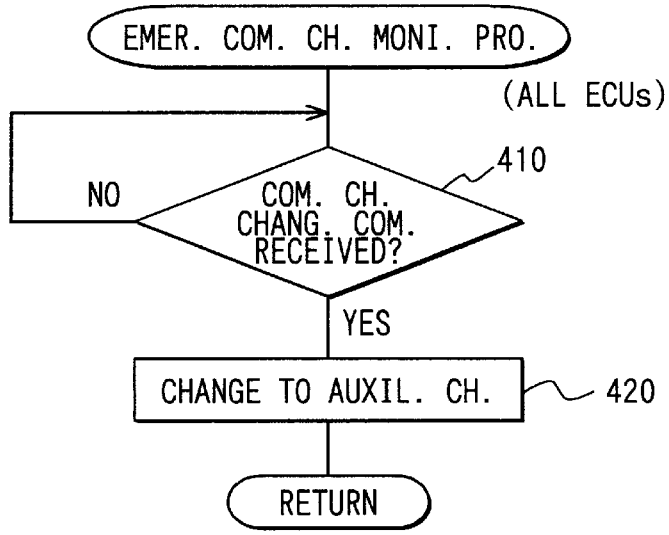
FIG. 7B is a flow chart showing an emergency communication CH monitoring process executable by all ECUs with respect to the process of FIG. 7A.

That is, the data monitoring and transferring process shown in FIG. 6 can be changed to one shown in FIG. 7A. In this way, when the gateway ECU 50 determines that a communication abnormality has occurred in a certain group (network) (step 330: NO), the process, which performs the functions of a communication channel changing means, is executed. That is, the gateway ECU 50 transmits the communication channel changing command to all of the ECUs in the certain group through the dedicated emergency information transceiver circuit or emergency communicating means (i.e., the emergency communication channel) (step 375). In the ECUs of the certain group, an emergency communication CH monitoring process is executed, as shown in FIG. 7B. Thus, information, which is received by the dedicated emergency information transceiver circuit (the emergency communicating means) through the emergency communication channel, is continuously monitored in each corresponding ECU of the certain group, and it is determined whether the communication channel changing command to its transceiver circuit 60 has been received (step 410). When it is determined that the communication channel changing command to its transceiver circuit 60 has been received, the PN code of its transceiver circuit 60 is changed to the PN code corresponding to the auxiliary channel (for example, PN1 is changed to PN1') (step 420).

It is not necessary to provide the functions of the communication channel changing means only in the gateway ECU 50. The functions of the communication channel changing command can be provided in some ECUs in each group, such that the functions of the communication channel changing means is provided in at least one transceiver circuit, preferably two or more transceiver circuits in each group.

Figure 8:
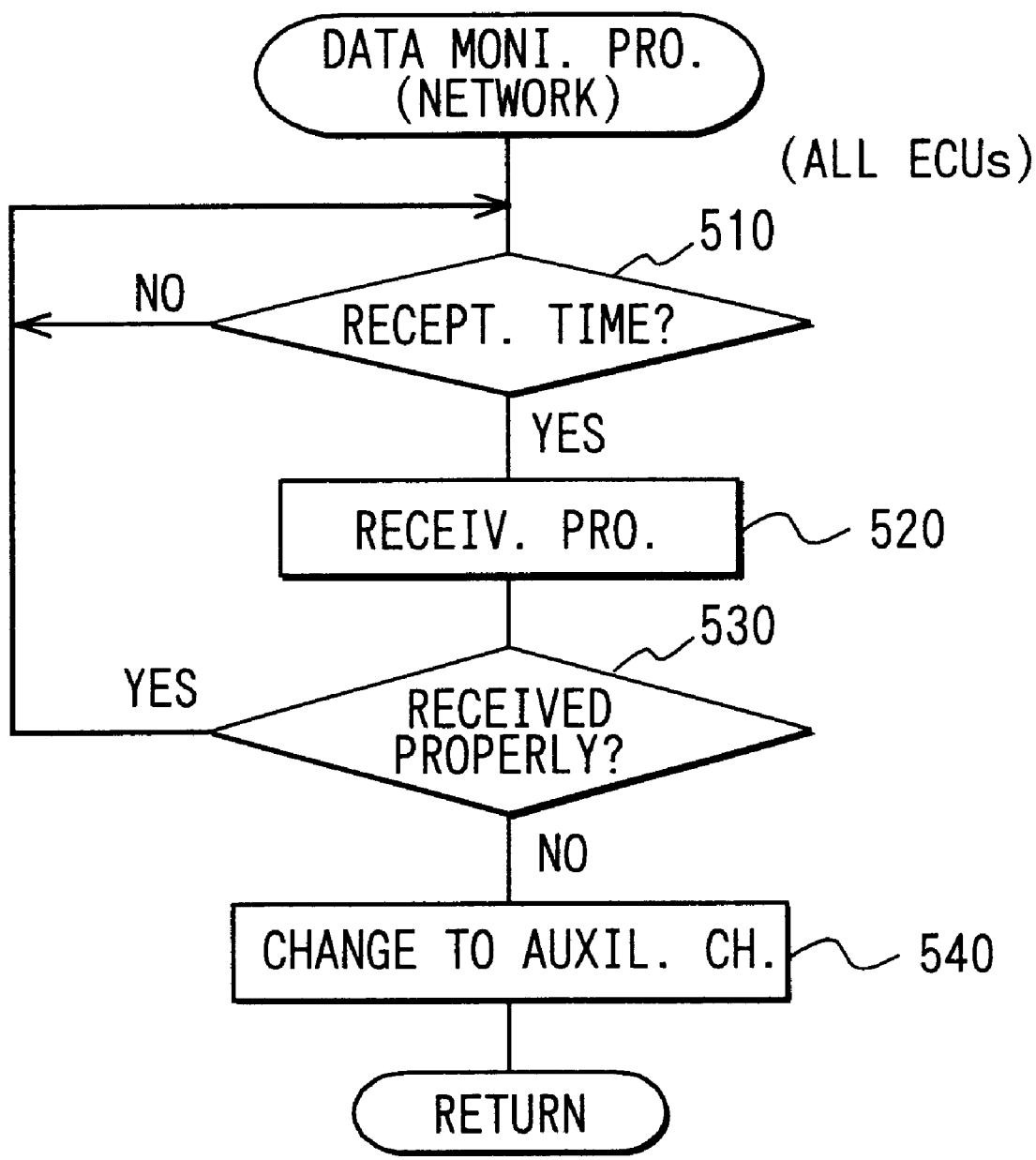
FIG. 8 is a flow chart showing an example of data monitoring process executable by all ECUs.

Furthermore, as shown in FIG. 8, every one of the ECUs can determine whether the receiving process is executed properly in the group (network), to which the transceiver circuit (or receiver circuit) of the respective ECU belongs (steps 510–530). When it is determined that the receiving process is not executed properly, the PN code of the corresponding transceiver circuit 60 is changed to the PN code, which corresponds to the auxiliary channel (for example, PN1 is changed to PN1') (step 540).

FIG. 8 is a flow chart (of data monitoring processing) showing a case where every one of the ECUs constituting the vehicular communication system of the second embodiment has been given the functions of the communication channel changing means, and the process of steps 510–530 is executed in the same way as the process of steps 310–330 shown in FIGS. 6 and 7.

The communication system using the FDMA system, which communicates through the power supply line, is disclosed in the first embodiment, and the communication system using the SS system (CDMA system), which communicates through the radio communication link, is disclosed in the second embodiment. However, it should be noted that each of these systems can be achieved through any one of the power supply line, the radio communication and the dedicated signal line.

Additional advantages and modifications will readily occur to those skilled in the art. The invention in its broader terms is therefore, not limited to the specific details, representative apparatus, and illustrative examples shown and described.

What is claimed is:

1. A vehicular communication system that communicates information among a plurality of electronic devices installed in a vehicle, the vehicular communication system comprising:
    a plurality of communicating means for communicating information, and each communicating means is provided in an associated one of the electronic devices, wherein:
        the plurality of communicating means is divided into groups of communicating means; and
        each communicating means of a given group communicates with the communicating means of the same group using one of a predetermined communication frequency and a predetermined code, which is allocated to the given group and is different from that of any other group.

2. A vehicular communication system according to claim 1, wherein each communicating means of the given group performs simultaneous multiplex communication with the communicating means of the same group using one of FDMA and CDMA.

3. A vehicular communication system according to claim 1, wherein:
    each electronic device is connected to a power supply line arranged in the vehicle to supply electric power to each electronic device; and
    each communicating means of the given group communicates information through one of the power supply line and a wireless link, wherein the wireless link is established between each communicating means of the given group and the communicating means of the same group.

4. A vehicular communication system according to claim 1, wherein:
    the plurality of communicating means is divided into the groups of communicating means based on types of information communicated among the plurality of communicating means; and
    one or more of the electronic devices have two or more of the plurality of communicating means, which belong to different groups, to obtain two or more types of information.

5. A vehicular communication system according to claim 1, wherein the plurality of communicating means is divided into the groups of communicating means based on types of the electronic devices, so that each electronic device includes the communicating means of a corresponding one of the groups.

6. A vehicular communication system according to claim 1, wherein:
the plurality of communicating means is divided into the groups of communicating means in such a manner that each group of communicating means includes two or more of the plurality of communicating means; and
the two or more communicating means of each group include:
a transmitter means, which is provided in an associated one of the electronic devices to transmit information of the associated one of the electronic devices; and
one or more receiver means, each of which is provided in an associated one of the electronic devices that requires the information transmitted from the transmitter means.

7. A vehicular communication system according to claim 1, wherein at least one of the electronic devices includes:
two or more of the plurality of communicating means that belong to different groups; and
an information relaying means, which receives information from a first one of the two or more communicating means and outputs the information through a second one of the two or more communicating means when the information received from the first one of the two or more communicating means is preset to be transferred to the communicating means of another group, to which the second one of the two or more communicating means belongs.

8. A vehicular communication system according to claim 1, wherein each communicating means transmits information according to a preset transmission schedule.

9. A vehicular communication system according to claim 8, wherein:
at least one of the electronic devices includes a channel changing command generating means in addition to each associated communicating means that is associated with the at least one of the electronic devices;
the channel changing command generating means receives information received by the associated communicating means and monitors whether information is transmitted and received at a predetermined timing specified by the corresponding schedule within the group, to which the associated communicating means belongs, based on the information received by the associated communicating means; and
when it is determined that information is not transmitted and received at the predetermined timing specified by the corresponding schedule within the group, to which the associated communicating means belongs, the channel changing command generating means outputs a channel changing command for changing the one of the predetermined communication frequency and the predetermined code to all of the communicating means of the group, to which the associated communicating means belongs.

10. A vehicular communication system according to claim 9, wherein:
each electronic device includes:
an emergency communicating means, which belongs to a dedicated emergency information communicating group; and
a communication channel changing means, which changes a communication channel of each corresponding communicating means based on the channel changing command when the emergency communicating means receives the channel changing command, which is outputted to the corresponding communicating means that belongs to the group of communicating means other than the dedicated emergency information communicating group; and
each channel changing command generating means outputs the channel changing command through the emergency communicating means, which is provided in the corresponding electronic device that has the channel changing command generating means.

11. A vehicular communication system according to claim 8, wherein:
each electronic device further includes a communication channel changing means in addition to each associated communicating means that is associated with the electronic device;
the communication channel changing means receives information received by the associated communicating means and monitors whether information is transmitted and received at a predetermined timing specified by the corresponding schedule within the group, to which the associated communicating means belongs, based on the information received by the associated communicating means; and
when it is determined that information is not transmitted and received at the predetermined timing specified by the corresponding schedule within the group, to which the associated communicating means belongs, the communication channel changing means changes the one of the predetermined communication frequency and the predetermined code, which is used by the associated communicating means, to one of an auxiliary communication frequency and an auxiliary code assigned to a preset auxiliary communication channel.

* * * * *